(12) United States Patent
Zangara et al.

(10) Patent No.: US 8,354,469 B2
(45) Date of Patent: Jan. 15, 2013

(54) PERFLUOROPOLYMER COMPOSITION

(75) Inventors: Anthony V. Zangara, Mount Laurel, NJ (US); Jeffrey A. Hrivnak, Arese (IT)

(73) Assignee: Solvay Solexis, Inc., West Deptford, NJ (US)

( * ) Notice: Subject to any disclaimer, the term of this patent is extended or adjusted under 35 U.S.C. 154(b) by 556 days.

(21) Appl. No.: 12/094,749

(22) PCT Filed: Nov. 23, 2006

(86) PCT No.: PCT/EP2006/068829
§ 371 (c)(1),
(2), (4) Date: Oct. 2, 2008

(87) PCT Pub. No.: WO2007/060201
PCT Pub. Date: May 31, 2007

(65) Prior Publication Data
US 2009/0069480 A1    Mar. 12, 2009

Related U.S. Application Data

(60) Provisional application No. 60/739,421, filed on Nov. 25, 2005.

(51) Int. Cl.
| | |
|---|---|
| C08F 6/20 | (2006.01) |
| C08F 14/00 | (2006.01) |
| C08F 114/00 | (2006.01) |
| C08F 214/00 | (2006.01) |
| C08G 18/08 | (2006.01) |
| C08G 18/62 | (2006.01) |
| C08J 9/00 | (2006.01) |
| C08K 3/10 | (2006.01) |
| C08K 3/18 | (2006.01) |
| C08K 3/22 | (2006.01) |
| C08K 3/38 | (2006.01) |
| C08L 27/12 | (2006.01) |
| C09D 5/08 | (2006.01) |
| D06M 15/277 | (2006.01) |
| H01B 3/44 | (2006.01) |
| H02G 15/00 | (2006.01) |

(52) U.S. Cl. .................. 524/544; 174/110 FC; 521/123; 521/145; 523/173; 524/405; 524/406; 524/430; 524/545; 524/546

(58) Field of Classification Search .................. 521/123, 521/145; 523/173; 524/405, 406, 430, 544, 524/545, 546; 174/110 FC
See application file for complete search history.

(56) References Cited

U.S. PATENT DOCUMENTS

| | | | |
|---|---|---|---|
| 3,072,583 | A | 1/1963 | Randa |
| 4,898,906 | A | 2/1990 | Hannecart |
| 4,957,961 | A | 9/1990 | Chandrasekaran et al. |
| 6,054,538 | A | 4/2000 | Thulliez et al. |
| 6,355,277 | B1 | 3/2002 | Day et al. |
| 6,369,130 | B1 | 4/2002 | Zolotnitsky et al. |
| 6,797,760 | B1 | 9/2004 | Ebrahimian et al. |
| 2002/0061934 | A1 | 5/2002 | Hrivnak |
| 2005/0154106 | A1 | 7/2005 | Henry et al. |
| 2005/0173674 | A1 | 8/2005 | Globus et al. |

FOREIGN PATENT DOCUMENTS

EP    0332932 A2    9/1989

OTHER PUBLICATIONS

PCT International Search Report dated Feb. 21, 2007 for International Patent Application No. PCT/EP2006/068829 (3 pp.).
PCT International Preliminary Report on Patentability dated May 27, 2008, including the Written Opinion from ISA, for International Patent Application No. PCT/EP2006/068829 (5 pp.).

*Primary Examiner* — Patrick Niland
(74) *Attorney, Agent, or Firm* — Arent Fox LLP

(57) ABSTRACT

The invention concerns a composition comprising:
  at least one melt-processible per(halo)fluoropolymer (polymer A);
  from 0.01 to 5% by weight of polymer A of at least one smoke-suppressant agent (S) having a decomposition temperature of at least 350° C., selected from the group consisting of molybdenum derivatives, borates of an alkaline-earth metal or of a group 12 transition metal, and mixtures thereof;
  optionally, at least one oxide of a metal different from molybdenum.

Figure 1:
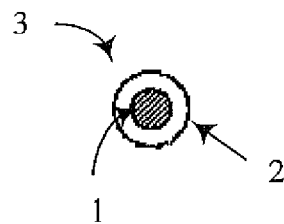

The composition of the invention excels simultaneously in providing excellent insulating properties on meal wires or optical fibers, outstanding processing parameters for high speed cable manufacture and high performance ratings on flammability, smoke generation and fuel load. Advantageously, cables comprising said composition comply with 25/50/8 requirements according to NFPA-255 and -259 for limited combustible materials.

19 Claims, 1 Drawing Sheet

PERFLUOROPOLYMER COMPOSITION

CROSS-REFERENCE TO RELATED APPLICATIONS

This application is a National Stage entry of International Application No. PCT/EP2006/068829, having an international filing date of Nov. 23, 2006; which claims priority to U.S. application Ser. No. 60/739,421, filed Nov. 25, 2005, the disclosures of each of which is hereby incorporated in its entirety by reference.

This application relates to fluoropolymer compositions suitable for wire insulation and cable jacketing for communication cables that are run through air plenums.

The National Electrical Code presently requires that such cables be either placed within a metal conduit or be insulated with materials that result in low flame and low smoke emission. This invention relates to improved materials that can be used as wire insulation and cable jacketing for communication cables which are run through air plenums without the use of a metal conduit and which conform to Underwriters Laboratories (UL) and National Electrical Code standards.

More and more cables (for instance for data transmission between computers, voice communications, as well as control signal transmission for building security, fire alarm, and temperature control systems) are often installed in the air return space above the suspended ceiling without the use of metal conduits. Combustible materials (isolating or jacketing materials from cables) are thus accumulating in plenums in ever-increasing amounts.

The accumulation of said combustible materials in air return plenum spaces has caught the attention of American associations like the National Building Code Community, the National Fire Protection Association (NFPA) and two key groups within the NFPA (the 90A Heating and Ventilating Group, and the 70 National Electrical Code Group) because cables can present a larger fire load than wall coverings or furniture.

The pass/fail criteria for materials such as wallboard and ceiling tile, which are either used to manufacture these spaces or will be exposed to the air flow, is controlled by the NFPA-255 and 259 tests; it is thus required to a "Limited Combustible" (LC) material to pass the 25/50/8 test, i.e. having a Flame Spread Rating of $\leq 25$, a Smoke Developed Index of $\leq 50$ per NFPA-255 and a Potential Heat Value of $\leq 3500$ Btu/lb (equal to 8141 kJ/kg) per NFPA-259.

In response to the request of safer cables, manufacturers have introduced a new plenum cable with higher fire safety characteristics. This new classification of cable is called "Limited Combustible Cable" and is identified by the listing mark "Limited Combustible FHC 25/50 CMP". To evaluate cable performances, it has appeared "logical" to apply the 25/50/8 requirements of LC materials for cables as tested per NFPA's 255 and 259.

The primary difference between traditional combustible plenum cables and the limited combustible cable is that the latter is both insulated and jacketed with materials complying with the 25/50/8 requirements according to NFPA's 255 and 259.

The designers of the first plenum cables used perfluoropolymers, the best available fire resistant and low smoke producing materials at the time. The first plenum cables listed had Fluorinated Ethylene Propylene (FEP) insulation and jackets, basically the same materials used today to meet the limited combustible listing requirements of 25/50/8. Nevertheless, electrical performances of FEP are limited and this material is not suitable for the manufacture of all parts of cables such as those for Gigabit Ethernet and future higher speed LAN applications, e.g. those complying with transmission requirements of ANSI/TIA/EIA 568-B.2, Addendum 1, Category 6 (so-called "category 6-cables").

Other perfluoromaterials, such as MFA (TFE/perfluoromethylvinyl ether copolymer) and PFA (TFE/perfluoropropylvinylether copolymer), have also been used in the past for plenum cable, as they can be successfully tested according to NFPA-262. Nevertheless, contrarily to FEP, such perfluoromaterials have been considered not suitable materials for limited combustible applications, either as they did not inherently possess required anti-smoke and combustion properties or because of their difficult processing technologies (PTFE, for instance, can not be processed in the melt using traditional wire coating lines).

Moreover it has been generally supposed that smoke-suppressing and flame retardant additives generally compounded with partially fluorinated materials such as PVDF, ECTFE, ETFE, would not be effective with such perfluoromaterials, in view of the difficulties in blending and dispersing such compounds in the perfluoropolymer matrix and considering the different behavior of such smoke-suppressant in a matrix free of hydrogen atoms.

In order to meet the ever more stringent standards for limited combustible and to achieve electrical performances for novel LAN structures, it would be useful to find alternative resins which can provide improved properties.

U.S. Pat. No. 6,797,760 discloses fluoroelastomer insulative compositions for telecom cables comprising a fluoropolymeric base polymer and a nanoclay additive; examples illustrate compositions based on PVDF fluoropolymer and olefinic polymers, wherein flame retardancy and smoke suppression properties are enhanced by adding, inter alia, molybdenum derivatives.

In US patent application No. 2005/015410, it has been thus proposed to use, as cable component, composites comprising of PVDF and a flame and smoke suppressant, selected from tungstates, molybdates or silicates; provided that the cable contains no more than about 50% weight of PVDF, such cable can fulfill the 25/50/8 requirements according to NFPA-255 and -259.

Molybdenum derivatives, which are widely known as smoke-suppressing additives for PVDF resins, as taught by U.S. Pat. No. 4,898,906 and, or for ECTFE resins, as taught by U.S. Pat. No. 4,957,961, have not been used in the past in combination with perfluorinated polymers.

US patent application No. 2005/0173674 discloses plenum cables complying with NFPA-255 burn test, said cable comprising a jacket comprising a highly filled composition made of a perfluoropolymer, preferably tetrafluoethylene/hexafluoroethylene copolymer (product also known as FEP, fluorinated ethylene propylene) and a char-forming agent, said agent constituting at least about 10 wt % and up to 60 wt % of said composition. Examples of char-forming agents are zinc molybdate, calcium molybdate and metal oxides such as ZnO, $Al_2O_3$, $TiO_2$, and $MgZnO_2$. This composition is not suitable for primary insulation, due to its poor dielectric properties. Moreover, in view of the high load in additives, its processability in the melt is affected so that only a very low line speed in the extrusion/jacket operation of about 100 ft/min can be achieved. It is thus necessary to add a hydrocarbon polymer for improving processability, which again has a negative impact on flammability properties.

There is thus a strong need in the art to provide for alternative resins able to comply with the limited combustible requirements useful as cable components, which can be easily processed in the melt using conventional equipments and which possess outstanding electrical properties, making it suitable for so-called "category 6-cables" to be used in Gigabit Ethernet and future higher speed LAN applications.

The Applicant has surprisingly found that melt-processable per(halo)fluoropolymers, such as PFA and MFA, can be modified to comply with the above-mentioned LC 25/50/8 requirements by addition of selected smoke-suppressant additives, which can be successfully incorporated in the polymer matrix to substantially improve flame and smoke resistance.

BRIEF SUMMARY OF THE INVENTION

It is thus an object of the present invention a composition comprising:
- at least one melt-processable per(halo)fluoropolymer (polymer A);
- from 0.01 to 5% by weight of polymer A of at least one smoke-suppressant agent (S) having a decomposition temperature of at least 350° C., selected from the group consisting of molybdenum derivatives, borates of an alkaline-earth metal or of a group 12 transition metal, and mixtures thereof;
- optionally, at least one oxide of a metal different from molybdenum.

The composition of the invention excels simultaneously in providing excellent insulating properties on metal wires or optical fibers, outstanding processing parameters for high speed cable manufacture and high performance ratings on flammability, smoke generation and fuel load. Advantageously, cables comprising said composition comply with 25/50/8 requirements according to NFPA-255 and -259 for limited combustible materials. Moreover, such compositions can be used for providing cables complying electric transmission requirements as per ANSI/TIA/EIA 568-B.2, Addendum 1, Category 6.

Another object of the invention is a foamed insulation comprising said composition.

Still an object of the invention is a process for manufacturing said composition.

The invention also concerns a cable comprising said composition.

DETAILED DESCRIPTION OF THE INVENTION

The inventive composition comprises:
- at least one melt-processable per(halo)fluoropolymer (polymer A);
- from 0.01 to 5% by weight of polymer A of at least one smoke-suppressant agent (S) having a decomposition temperature of at least 350° C. selected from the group consisting of molybdenum derivatives, borates of an alkaline-earth metal or of a group 12 transition metal, and mixtures thereof;
- optionally, at least one oxide of a metal different from molybdenum.

In the rest of the text, the expressions "melt-processable per(halo)fluoropolymer" and "polymer (A)" are understood, for the purposes of the present invention, both in the plural and the singular, that is to say that the inventive composition may comprise one or more than one polymer (A).

Preferably, the composition of the invention comprises only one polymer (A).

For the purpose of the invention, the term "per(halo)fluoropolymer" [polymer (A)] is intended to denote a fluoropolymer substantially free of hydrogen atoms.

The per(halo)fluoropolymer can further comprise one or more other halogen atoms (Cl, Br, I).

The term "substantially free of hydrogen atom" is understood to mean that the per(halo)fluoropolymer is prepared from ethylenically unsaturated monomers comprising at least one fluorine atom and free of hydrogen atoms (per(halo) fluoromonomer).

The per(halo)fluoropolymer can be a homopolymer of a per(halo)fluoromonomer or a copolymer comprising recurring units derived from more than one per(halo)fluoromonomers.

Non limitative examples of suitable per(halo)fluoromonomers are notably:
- $C_2$-$C_8$ perfluoroolefins, such as tetrafluoroethylene (TFE) and hexafluoropropene (HFP);
- chloro- and/or bromo- and/or iodo-$C_2$-$C_6$ fluoroolefins, like chlorotrifluoroethylene;
- per(halo)fluoroalkylvinylethers complying with general formula $CF_2=CFOR_{f3}$ in which $R_{f3}$ is a $C_1$-$C_6$ per(halo)fluoroalkyl, such as $-CF_3$, $-C_2F_5$, $-C_3F_7$;
- $CF_2=CFOX_{01}$ per(halo)fluoro-oxyalkylvinylethers, in which $X_{01}$ is a $C_1$-$C_{12}$ per(halo)fluorooxyalkyl having one or more ether groups, like perfluoro-2-propoxypropyl group;
- per(halo)fluoro-oxyalkylvinylethers complying with general formula $CF_2=CFOCF_2OR_{f4}$ in which $R_{f4}$ is a $C_1$-$C_6$ per(halo)fluoroalkyl, such as $-CF_3$, $-C_2F_5$, $-C_3F_7$ or a $C_1$-$C_6$ per(halo)fluorooxyalkyl having one or more ether groups, such as $-C_2F_5-O-CF_3$;
- functional per(halo)fluoro-alkylvinylethers complying with formula $CF_2=CFOY_{01}$, in which $Y_{01}$ is a $C_1$-$C_{12}$ per(halo)fluoroalkyl, or a $C_1$-$C_{12}$ per(halo)fluorooxyalkyl having one or more ether groups, and $Y_{01}$ comprises a carboxylic or sulfonic acid group, in its acid, acid halide or salt form;
- per(halo)fluorodioxoles.

Preferred per(halo)fluoropolymers [polymer (A)] are notably TFE copolymers comprising recurring units derived from at least one fluorinated comonomer chosen among the group consisting of:
(i) perfluoroalkylvinylethers complying with formula $CF_2=CFOR_{f1'}$, in which $R_{f1'}$ is a $C_1$-$C_6$ perfluoroalkyl, e.g. $-CF_3$, $-C_2F_5$, $-C_3F_7$; and/or
(ii) perfluoro-oxyalkylvinylethers complying with formula $CF_2=CFOX_0$, in which $X_0$ is a $C_1$-$C_{12}$ perfluorooxyalkyl having one or more ether groups, like perfluoro-2-propoxy-propyl; and/or
(iii) $C_3$-$C_8$ perfluoroolefins, such as hexafluoropropylene.

More preferred per(halo)fluoropolymers are TFE copolymers comprising recurring units derived from at least one fluorinated comonomer chosen among the group consisting of
(i) perfluoroalkylvinylethers, as above detailed;
(ii) perfluoro-oxyalkylvinylethers, as above detailed.

Good results have been obtained with TFE copolymers wherein the fluorinated comonomer is one or more than one perfluoroalkylvinylether as above specified; particularly good results have been achieved with TFE copolymers wherein the fluorinated comonomer is perfluoromethylvinylether (of formula $CF_2=CFOCF_3$), perfluoroethylvinylether (of formula $CF_2=CFOC_2F_5$) and/or perfluoropropylvinylether (of formula $CF_2=CFOC_3F_7$).

Best results have been obtained with TFE copolymers wherein the fluorinated comonomer is perfluoromethylvinylether (of formula $CF_2=CFOCF_3$), and/or perfluoropropylvinylether (of formula $CF_2=CFOC_3F_7$). Such copolymers are currently designated, respectively, as MFA and PFA.

The TFE copolymers as above detailed comprise advantageously at least 2% wt, preferably at least 5% wt, more preferably at least 7% wt of recurring units derived from the fluorinated comonomer.

The TFE copolymers as above detailed comprise advantageously at most 30% wt, preferably at most 25% wt, more preferably at least 20% wt of recurring units derived from the fluorinated comonomer.

Good results have been obtained with TFE copolymers as above detailed comprising at least 2% wt and at most 30% wt of recurring units derived from the fluorinated comonomer.

According to a preferred embodiment of the invention, the polymer (A) is advantageously a TFE copolymer consisting of:

(a) from 7 to 13% by weight of recurring units derived from perfluoromethylvinylether;

(b) from 0 to 3% by weight of recurring units derived from one or more than one fluorinated comonomer different from perfluoromethylvinylether and selected from the group consisting of perfluoroalkylvinylethers, as above detailed and/or perfluoro-oxyalkylvinylethers, as above detailed; preferably derived from perfluoroethylvinylether and/or perfluoropropylvinylether;

(c) recurring units derived from tetrafluoroethylene, in such an amount that the sum of the percentages of the recurring units (a), (b) and (c) is equal to 100% by weight.

MFA and PFA suitable to be used for the composition of the invention are commercially available from Solvay Solexis Inc. under the trade name of HYFLON® PFA and MFA.

The polymer (A) shall be melt-processable.

For the purposes of the present invention, by the term "melt-processible" is meant that the per(halo)fluoropolymer (A) can be processed (i.e. fabricated into shaped articles such as tubes, wire coatings and the like) by conventional melt extruding, injecting or casting means.

Such typically requires that the dynamic viscosity at a shear rate of 1 s$^{-1}$ and at a temperature exceeding melting point of roughly 30° C., preferably at a temperature of $T_{m2}$+ (30±2° C.), is comprised between 10 and $10^6$ Pa×s, when measured with a controlled strain rheometer, employing an actuator to apply a deforming strain to the sample and a separate transducer to measure the resultant stress developed within the sample, and using the parallel plate fixture.

The melt processible per(halo)fluoropolymer (A) has a dynamic viscosity at a shear rate of 1 s$^{-1}$ in the above specified conditions preferably comprised between 20 and 2000 Pa×s, more preferably between 70 and 700 Pa×s.

The per(halo)fluoropolymer (A) is present in the composition in an amount of advantageously at least 50%, preferably at least 75%, more preferably at least 90%, still more preferably at least 95%, most preferably at least 97% by weight of the total weight of the composition.

Advantageously, the per(halo)fluoropolymer (A) is the sole melt-processable polymer component of the composition of the invention.

According to a first embodiment of the invention, the per (halo)fluoropolymer (A) possesses a dielectric constant of advantageously at most 3.1, preferably at most 2.85, most preferably at most 2.6.

Compositions according to the first embodiment of the invention are particularly suitable for cable jacketing.

According to a second embodiment of the invention, the per(halo)fluoropolymer (A) possesses a dielectric constant of advantageously at most 2.4, preferably at most 2.3, most preferably at most 2.2. Excellent results have been obtained with per(halo)fluoropolymers having dielectric constant from about 2.0 to about 2.1.

Compositions according to the second embodiment of the invention are particularly suitable for primary insulation of cable conductors.

In the rest of the text, the expression "smoke-suppressant agent (S)" is understood, for the purposes of the present invention, both in the plural and the singular, that is to say that the inventive composition may comprise one or more than one smoke-suppressant agent (S).

Preferably the composition of the invention comprises only one smoke-suppressant agent (S).

It is essential that the smoke-suppressant agent (S) has a decomposition temperature exceeding 350° C., preferably exceeding 365° C., more preferably exceeding 370° C.

When the smoke-suppressant agent (S) has a decomposition temperature of less than 350° C., it undergoes decomposition phenomena during processing of the per(halo)fluoropolymer (A) and does not remain available in the composition for improving the smoke-properties.

The smoke-suppressant agent (S) is present in the composition in an amount of 0.01 to 5% by weight of the per(halo)fluoropolymer (A).

The smoke-suppressant agent (S) is present in an amount of at least 0.01%, preferably at least 0.05%, more preferably at least 0.075, even more preferably at least 0.1%, most preferably at least 0.2% by weight of the per(halo)fluoropolymer (A). The smoke-suppressant agent (S) is present in an amount of at most 5%, preferably at most 4%, more preferably at most 3%, even more preferably at most 1% by weight of the per (halo)fluoropolymer (A).

Good results have been obtained with composition comprising from 0.1 to 1% of smoke-suppressant agent (S) by weight of per(halo)fluoropolymer (A). Best results have been achieved with composition comprising from 0.2 to 0.5% of smoke-suppressant agent (S) by weight of per(halo)fluoropolymer (A).

The Applicant has surprisingly found that the smoke-suppressant agents (S), as above described, are efficient flame-retardants and smoke-suppressing agents for the per(halo) fluoropolymer (A) and thus can enable achieving Limited Combustible 25/50/8 requirements as set up by NFPA-255 and -259.

Several borates of an alkaline earth metal or of a group 12 transition metal can be used. Said borates generally comprise as elements at least boron, oxygen and the alkaline earth metal or the group 12 transition metal; optionally, in addition, they can further comprise other metals, such as sodium, silicium and the like. Said borates may comprise water or may be anhydrous.

For the purpose of the invention, as group 12 transition metal, we intend designate the group of metals consisting of Zn, Cd, Hg, Uub.

Preferred are calcium, magnesium, zinc borates, and mixtures thereof.

Calcium borates can be chosen among ulexite, $Na_2O.2 CaO.5 B_2O_3.16 H_2O$ ($NaCaB_5O_9.8 H_2O$), having a $B_2O_3$ content of 43.0 wt %; colemanite 2 $CaO.3 B_2O_3.5 H_2O$ ($Ca_2B_6O_{11}.5 H_2O$), having a $B_2O_3$ content of 50.8 wt %; pandermite, 4 $CaO.5 B_2O_3.7 H_2O$ ($Ca_4B_{10}O_{19}.7 H_2O$), having a $B_2O_3$ content of 49.8% wt; hydroboracite, $CaO.MgO.3 B_2O_3.6 H_2O$ ($CaMgB_6O_{11}.6 H_2O$), having a $B_2O_3$ content of 50.5% wt; inyoite, 2 $CaO.3 B_2O_3.13 H_2O$ ($Ca_2B_6O_{11}.13 H_2O$), having a $B_2O_3$ content of 37.6% wt; datolite, 2 $CaO.B_2O_3.2 SiO_2.H_2O$ ($Ca_2B_2Si_2O_9.H_2O$), having a $B_2O_3$ content of 21.8 wt %; meyerhofferite, 2 $CaO.3 B_2O_3.7 H_2O$ ($Ca_2B_6O_{11}.7 H_2O$), having a $B_2O_3$ content of 46.7 wt %; howlite, 4 $CaO.5 B_2O_3.2 SiO_2.5 H_2O$ ($Ca_4B_{10}Si_2O_{21}.5 H_2O$), having a $B_2O_3$ content of 44.4 wt %; probertite, $Na_2O.2$ CaO.5 $B_2O_3$.10 $H_2O$ ($NaCaB_5O_9$.5 $H_2O$), having a $B_2O_3$ content of 49.6 wt %; and corresponding anhydrous forms.

Magnesium borates can be chosen among hydroboracite, CaO.MgO.3 $B_2O_3$.6 $H_2O$ ($CaMgB_6O_{11}$.6 $H_2O$), having a $B_2O_3$ content of 50.5 wt %; ascharite, 2 MgO $B_2O_3$.$H_2O$ ($Mg_2B_2O_5$.$H_2O$), having a $B_2O_3$ content of 41.4 wt %; inderite, 2 MgO.3 $B_2O_3$.15 $H_2O$ ($Mg_2B_6O_{11}$.15 $H_2O$), having a $B_2O_3$ content of 37.3 wt %; boracite, 5 MgO.$MgCl_2$.7 $B_2O_3$ ($Mg_3B_7O_{13}Cl$), having a $B_2O_3$ content of 62.2 wt %;and corresponding anhydrous forms.

Very preferred are zinc borates.

Zinc borates generally comply with formula 2 ZnO.3 $B_2O_3$.x $H_2O$, wherein x can vary between 2 and 9 (hydrated zinc borates), or can be zero. In this latter case, the zinc borate is also known as anhydrous zinc borate.

Hydrates of zinc borate include notably:
- 2 ZnO.3 $B_2O_3$.3.5 $H_2O$, which has typically a crystal density of 2.69 g/cm$^3$. It is generally made commercially from an aqueous boric acid solution with zinc oxide above 70° C. in the presence of product zinc borate seed. An induction period of 1-2 h is typically followed by a highly exothermic reaction.
- 2 ZnO.3 $B_2O_3$.7 to 7.5 $H_2O$, which has typically a crystal density of 2.44 g/cm$^3$.
- 2 ZnO.3 $B_2O_3$.9 $H_2O$, which is generally made using the same conditions as for the 2 ZnO.3 $B_2O_3$.3.5 $H_2O$, but at a temperature below 70° C.

Among Zinc borates, anhydrous Zinc borate is preferred.

The borate of an alkaline-earth metal or of a group 12 transition metal has a particle size distribution with a median particle size ($d_{50}$) of advantageously less than 25 μm, preferably less than 15 μm, most preferably less than 12 μm.

Median particle size of said borate can be measured according to ISO 13320, by laser light diffraction method.

Should the borate of an alkaline-earth metal or of a group 12 transition metal possess a median particle size exceeding 25 μm, it becomes difficult to efficiently dispersing it in the per(halo)fluoropolymer and thus overall smoke- and flame-suppressing properties of the composition are negatively affected.

Preferably the smoke-suppressing agent (S) is chosen among the molybdenum derivatives.

The molybdenum derivatives suitable for the composition of the invention are generally inorganic compounds.

The most effective, and those which are consequently preferred, are molybdenum derivatives in which the molybdenum is of valency 5 or 6.

Molybdenum derivatives are preferably chosen among molybdenum trioxide, molybdenum hydroxide of the general formula $MoO(OH)_3$, molybdenum halides and oxyhalides, such as molybdenum pentafluoride and hexafluoride, molybdenum pentachloride and molybdenyl chloride ($MoO_2Cl_2$), molybdic acid, metal or ammonium molybdates, phosphomolybdic acid and metal or ammonium phosphomolybdates.

The molybdenum derivatives which are particularly preferred are those in which the molybdenum is of valency 6. Amongst these, the metal molybdates are preferred. Examples of such metal molybdates which may be mentioned are the molybdates of sodium, bismuth, calcium, magnesium, zinc, aluminium, iron and manganese.

Molybdenum derivatives which are very particularly preferred are selected among the molybdates of calcium, magnesium, zinc and aluminium, and mixtures thereof, which have the advantages of being effective at low concentration and of not coloring the compositions, or not inducing coloration therein, especially during processing, and which are furthermore readily obtainable and inexpensive.

Such molybdenum derivatives can be used as such or as complexes with other metal oxides, hydroxides, silicates or carbonates.

The manufacture of molybdenum derivatives is in itself well known and is described, in particular, in Kirk-Othmer, Encyclopedia of Chemical Technology, 3rd ed., 1981, Volume 15, pp 683 et seq.

The molybdenum derivative has a particle size distribution with a median particle size ($d_{50}$) of advantageously less than 15 μm, preferably less than 10 μm, most preferably less than 5 μm.

Median particle size of molybdenum derivatives can be measured according to ISO 13320, by laser light diffraction method.

The molybdenum derivative has a 325 mesh residue of advantageously less than 5% wt, preferably less than 1% wt, more preferably less than 0.5% wt according to ASTM D 1514.

Should the molybdenum derivative possess a median particle size exceeding 15 μm or a 325 mesh residue exceeding 5% wt, it becomes difficult to efficiently dispersing it in the per(halo)fluoropolymer and thus overall smoke- and flame-suppressing properties of the composition are negatively affected.

The amount of molybdenum derivative present in the compositions according to the invention can vary within wide limits, especially according to the particular nature of the molybdenum derivative used.

Examples of molybdenum derivatives suitable for the purpose of the invention are notably KEMGARD® 911C zinc molybdate/magnesium silicate complex available from Sherwin-Williams Chemicals, having a median particle size ($d_{50}$) of 3.3 μm and a 325 mesh residue of less than 0.20% wt, KEMGARD® 911B basic zinc molybdate complex, available from Sherwin-Williams Chemicals, having a median particle size ($d_{50}$) of 2.3 μm and a 325 mesh residue of less than 0.01% wt, KEMGARD® MZM magnesium hydroxide/zinc molybdate complex available from Sherwin-Williams Chemicals, KEMGARD® CZB calcium molybdate/zinc molybdate complex, experimental product from Sherwin-Williams Chemicals, KEMGARD® CZZB calcium molybdate/zinc molybdate complex, experimental product from Sherwin-Williams Chemicals.

The Applicant thinks without this limiting the scope of the invention that the oxide of a metal advantageously acts as a whitener and can improve the color and/or optionally mask the color from the smoke-suppressing agent in the composition.

It is thus preferred that the compositions according to the invention further comprise at least one oxide of a metal different from molybdenum.

In the rest of the text, the expression "oxide of a metal" is understood, for the purposes of the present invention, both in the plural and the singular, that is to say that the inventive composition may comprise one or more than one oxide of a metal.

Preferably the composition of the invention comprises only one oxide of a metal.

Preferably, the oxide of a metal is an oxide of an alkaline-earth metal or of a group 12 transition metal.

For the purpose of the invention, as group 12 transition metal, we intend designate the group of metals consisting of Zn, Cd, Hg, Uub.

More preferably, the oxide is chosen among the group consisting of CaO, MgO, ZnO and mixtures thereof. Still more preferably, the oxide is ZnO.

The oxide has a particle size distribution with a median particle size ($d_{50}$) of advantageously less than 15 µm, preferably less than 10 µm, more preferably less than 5 µm, even more preferably less than 1 µm.

Median particle size of the oxide can be measured according to ISO 13320, by laser light diffraction method.

The oxide has a 325 mesh residue of advantageously less than 5% wt, preferably less than 1% wt, more preferably less than 0.5% wt according to ASTM D 1514.

Should the composition further comprise an oxide as above specified, the oxide is present in an amount of preferably at least 0.01%, more preferably at least 0.05%, even more preferably at least 0.075%, most preferably at least 0.1% by weight of the per(halo)fluoropolymer (A). The amount of oxide in the composition as above described is of at most 40%, preferably at most 35%, more preferably at most 25% by weight of the per(halo)fluoropolymer (A).

According to a preferred embodiment of the invention, the composition comprises advantageously at most 5%, preferably at most 3%, more preferably at most 1%, most preferably at most 0.5% of the oxide as above described by weight of the per(halo)fluoropolymer (A).

Good results have been obtained with composition comprising from 0.075 to 1% of oxide by weight of per(halo)fluoropolymer (A). Best results have been achieved with composition comprising from 0.1 to 0.5% of oxide by weight of per(halo)fluoropolymer (A).

Optionally, the composition described above can further comprise one or more of the following: processing aids, pigments, filling materials, electrically conductive particles, lubricating agents, heat stabilizer, anti-static agents, extenders, reinforcing agents, organic and/or inorganic pigments like $TiO_2$, and the like.

By way of non-limiting examples of filling material, mention may be made of mica, alumina, talc, carbon black, glass fibers, carbon fibers, graphite in the form of fibers or of powder, carbonates such as calcium carbonate, macromolecular compounds and the like.

As lubricating agents we can notably mention graphite, perfluorinated polymers, such as non-fibrillating PTFE, silicone oil, zinc stearate and the like.

Pigments useful in the composition notably include, or will comprise, one or more of the following: Artic blue #3, Topaz blue #9, Olympic blue #190, Kingfisher blue #211, Ensign blue #214, Russet brown #24, Walnut brown #10, Golden brown #19, Chocolate brown #20, Ironstone brown #39, Honey yellow #29, Sherwood green #5, and Jet black #1 available from Shepard Color Company, Cincinnati, Ohio, USA.; black F-2302, blue V-5200, turquoise F-5686, green F-5687, brown F-6109, buff F-6115, chestnut brown V-9186, and yellow V-9404 available from Ferro Corp., Cleveland, Ohio, USA and METEOR® pigments available from Engelhard Industries, Edison, N.J., USA.

The compositions of the invention can be obtained by any of the usual techniques for preparing polymer compositions, especially by a method comprising mixing the polymer (A) in the form of powders or granules with the molybdenum derivative (as well as optionally with the oxide and/or other additives or filling materials), in the desired proportions, before they are subjected to a thermomechanical processing technique such as extrusion, molding, sheathing and the like.

This operating method can be applied either with a view to manufacturing finished products such as, for example, cable sheating and the like, or, by adding a granulation stage thereto, with a view to have available granules containing the desired per(halo)fluoropolymer (A), the molybdenum derivative, optionally the oxide and/or additives and fillers in suitable proportions, which facilitates a subsequent conversion into finished products.

The invention also pertains to a foamed insulation comprising the composition as above detailed.

The composition of the invention can be foamed by a gas injection process and/or by use of a chemical blowing agent to yield a foamed insulation.

The composition comprised in the foamed insulation as above described preferably comprises a smoke-suppressant agent (S) having a decomposition temperature of at least 450° C.

In the gas-injection process, the gas dissolves and/or is generally dispersed in the molten composition inside the extruder. By adjusting the gas pressure in the feed, the amount of gas dissolved or dispersed in the melt composition can be controlled. As an alternative process, a chemical blowing agent (a chemical which is unstable at the polymer processing temperature and liberates a gas, such as nitrogen, carbon dioxide or hydrogen) can be incorporated into the composition to provide the gas which causes bubble formation.

Foam cell formation generally starts shortly after the molten composition comprising the gas or the chemical blowing agent passes out of the extrusion die.

The gas injected or generated, dissolved or dispersed in the molten composition typically expands because of the sudden drop in melt pressure as the extrudate of the composition exits the extrusion die. The composition is typically solidified when the extrudate is cooled, such as being treated with water, thereby stopping foam cell growth to yield the foamed insulation.

The composition of the invention is preferably foamed by continuous gas injection using nitrogen, carbon dioxide, argon, helium or other gas or gas mixture which is either soluble in or disperses in the molten composition, using an extruder screw designed for foam operations, and, optionally, a nucleating agent.

Nitrogen is especially suited for foaming the composition of the invention, because it easily dissolves and/or disperses in molten composition, and its thermal stability is adequate to survive the holdup time in the extruder when mixed with molten composition at temperatures up to about 450° C.

Foamed insulations of the invention generally comprise nucleating agents to achieve uniform small-diameter cell structure during processing. Conventional nucleating agents well-known in the art are boron nitride ("BN"), calcium carbonate, magnesium dioxide, lead oxide, barium oxide, antimony oxide, magnesium carbonate, zinc carbonate, barium carbonate, carbon black, graphite, alumina, calcium silicate, calcium metasilicate and calcium sulfate, titanium oxide. Polytetrafluoroethylene ("PTFE") is described in U.S. Pat. No. 4,304,713 as a nucleating agent for making dielectric compositions for use in coaxial cables, and U.S. Pat. No. 5,314,925 discusses fluoropolyolefin nucleating agents for molded thermoplastics. U.S. Pat. No. 5,716,665 addresses the use of PTFE, as well as BN, silicon nitride, alumina, talc and zinc sulfide, as nucleating agents for foamable solid compositions based on thermoprocessible. U.S. Pat. No. 6,395,795 discloses a nucleating agent system for fluoropolymer resins comprising $TiO_2$, inorganic salts and, optionally, sulfonic acid salts, and/or phosphonic acid salts.

Another aspect of the present invention concerns a process for manufacturing the composition as above described.

Advantageously, the process comprises (i) mixing by dry blending and/or (ii) melt compounding the polymer (A), the smoke-suppressant agent (S) and optionally the oxide of a metal different from molybdenum.

Preferably, the polymer (A), the smoke-suppressant agent (S) and optionally the oxide of a metal different from molybdenum are mixed by melt compounding.

Advantageously, the polymer (A), the smoke-suppressant agent (S) and optionally the oxide of a metal different from molybdenum are melt compounded in continuous or batch devices. Such devices are well-known to those skilled in the art.

The smoke-suppressant agent (S) can be melt compounded with the polymer (A) and optionally the oxide of a metal different from molybdenum either as neat compound or as a masterbatch, that is to say a concentrate comprising agent (S) in amount of advantageously at least 3% wt, preferably at least 4% wt, more preferably at least 5% wt.

Examples of suitable continuous devices to melt compound the composition of the invention are notably screw extruders. Preferably, the polymer (A), the smoke-suppressant agent (S) and optionally the oxide of a metal different from molybdenum are melt compounded in a twin-screw extruder.

Optionally, the polymer (A), the smoke-suppressant agent (S) and optionally the oxide of a metal different from molybdenum are dry mixed in powder form in a high intensity mixer at a temperature of advantageously 20° C. to 45° C., before melt compounding in a screw extruder. Suitable high intensity dry-mixers are well known to those skilled in the art. Good results have been obtained with a HENSCHEL-MIXER® from HENSCHEL-MixingSystems™, Broadview Heights, Ohio, USA.

Another object of the invention is a cable comprising the composition as above detailed.

The components of a cable may include a jacket, a primary insulation sheath, and may include various sub-components such as a shield tape, a strength member, crossweb, film, buffer, separator, pull cord, sub-jacket, all well known in the industry, any one or more of which may comprise the composition of the invention.

Preferably, the cable of the invention comprises at least one among primary insulation sheath, jacket and crossweb comprising the composition as above detailed.

Materials for cable components as listed above are generally selected on the basis of several criteria including high dielectric strength, low dielectric constant, and low dissipation factor. It has previously been found that if the material is foamed as it is applied to wire, the dielectric constant is desirably reduced due to the formation of numerous small non-interconnected cells in the foam. Thus, according to an embodiment of the invention, the cable comprises a foamed insulation comprising the composition as above detailed. The composition of the invention can be foamed to yield a cable comprising the foamed insulation of the invention as detailed in U.S. Pat. No. 3,072,583, whose disclosures are incorporated herein by reference.

Preferred cables according to the invention are insulated wire, communication cables, and optical cables.

FIG. 1 is a section view of an insulated cable according to a first embodiment of the invention. The insulated wire (3) of FIG. 1 comprises an optic fiber (1) or a metal conductor wire (1), generally aluminium or copper, preferably copper, surrounded by a primary insulation sheath (2) comprising the composition of the invention. Preferred cables of this embodiment are insulated wires comprising a metal conductor wire.

The primary insulation sheath (2) can be advantageously extruded using a tubing or semi-tubing technique which involves a crosshead assembly and a tip and die configuration that contains flow channels designed to maximize the uniformity of the coating on the conductor wire. A tube of the composition of the invention is advantageously extruded around and spaced from the conductor wire, and said tube is advantageously extruded such that the thickness of the composition of the invention is reduced or drawn down before it contacts the conductor wire. A vacuum is advantageously provided between the conductor wire and the composition of the invention being extruded thereby causing atmospheric pressure to progressively press said extruded composition into contact with the conductor wire.

As an alternative, application of the composition through means of pressure extrusion technique may also be suitable. In pressure extrusion, conductor wire is advantageously brought into contact with molten composition within the crosshead die to form the coating and no tube is extruded.

Same processes, i.e. tubing or semi-tubing and/or pressure extrusion can be also similarly applied to the sheathing of optical fibers.

Figure 2:
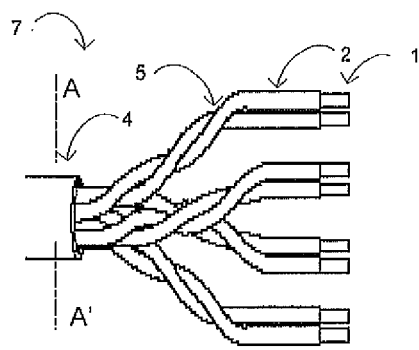

FIG. 2 is a side view, with parts broken away, of a communication cable (7) according to a second embodiment of the invention. The electrical cable embodiment of the invention illustrated in FIG. 2 generally comprises a plurality of individual electrical conductors, which each comprises a conductor wire (1) and a primary insulation sheath (2) so that they are electrically insulated from one another. Pairs of said wires are generally twisted into a bundle (5) and several bundles are held together by jacket (4). Both jacket (4) and primary insulation sheath (2) can comprise the composition or the foamed insulation as above detailed.

Jacket (4) can be formed by extrusion either by tubing or semi-tubing techniques or using a crosshead die by pressure extrusion, as above described for the primary insulation sheath.

In communication cables, four pairs of insulated wires are generally twisted together and said twisted pairs (5) are typically held together by jacket (4).

Any one or more of jacket (4) and primary insulation sheaths (2) can comprise the composition or the foamed insulation as above detailed.

The communication cables according to the second embodiment of the invention advantageously comply with the requirements of ANSI/TIA/EIA 568-B.2, Addendum 1, Category 5e and are typically suitable for use in general purpose and LAN communications.

Figure 3:
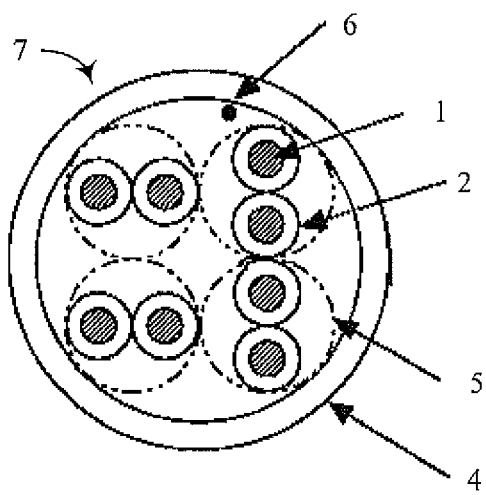

FIG. 3 is a cross-sectional view along A-A' plane (see FIG. 2) of the communication cable (7) according to the second embodiment of the invention the invention. A ripcord (6) can be present.

Figure 4:
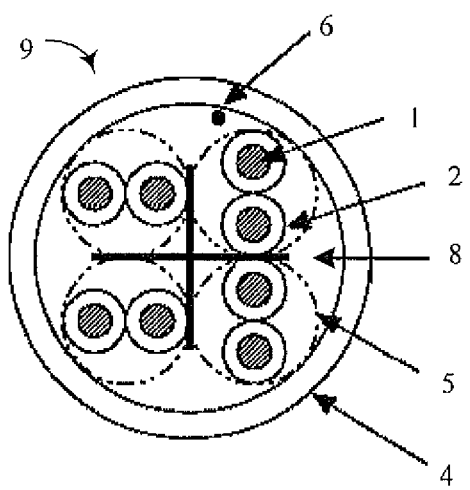

FIG. 4 is a cross-sectional view of a communication cable (9) according to the third embodiment of the invention. The electrical cable embodiment of the invention illustrated in FIG. 4 generally comprises a plurality of individual electrical conductors, which each comprises a conductor wire (1) and a primary insulation sheath (2) so that they are electrically insulated from one another. Pairs of said wires are generally twisted into a bundle (5) and several bundles are held together by jacket (4) and additional electrical insulation is provided by the crossweb (8). A ripcord (6) can be present. Any one or more of jacket (4), primary insulation sheaths (2) and crossweb (8) can comprise the composition or the foamed insulation as above detailed.

The communication cables according to the third embodiment of the invention advantageously comply with transmission requirements of ANSI/TIA/EIA 568-B.2, Addendum 1, Category 6 (so-called "category 6-cables") and are typically suitable for Gigabit Ethernet and future high speed applications.

According to a fourth embodiment of the invention, the cable is an optical cable. In an optical cable according to the invention, the wires could be replaced by glass optical fiber strands. Thus, a typical construction of an optical cable according to the invention comprises a plurality of groups of six glass fiber optic strands wrapped around another glass strand or a coated steel wire or core, each of said groups being surrounded by a primary sheathing, and said plurality of groups being surrounded by a jacket.

In this case, the primary sheathing and/or the jacket can comprise the composition or the foamed insulation as above detailed.

Thanks to the outstanding properties of the composition as above detailed, the cables of the invention can be advantageously manufactured at high extrusion rates and advantageously provide lower fire safety hazard and better electrical transmission properties.

Some examples of the present invention are reported hereinafter, whose purpose is merely illustrative but not limitative of the scope of the invention itself.

EXAMPLES

Compounding Procedure

Compositions were prepared in a Thyssen HENSCHEL-MIXER® type FM 10C and pellitized using a BRABENDER® twin screw extruder equipped with 10:1 L:D (length/diameter) screws.

Small Scale Pan-test

Compositions were put into a small aluminium pan and placed in an air-circulating oven operating at 325° C. Samples were removed and checked after 3 hours at 325° C. Pass/fail criteria were based on sample appearance after heating at 325° C.: phenomena like bubbling, discoloration, darkening were considered as failing features.

Cone Calorimeter Test

The Cone Calorimeter test is a small scale method for assessing materials reaction to fire. The method follows the procedure given in ASTM E 1354-02 standard. The surface of the test specimen is exposed to a constant level of heat irradiance, within the range 0-100 kW/m$^2$, from a conical heater. Volatile gases from the heated specimen are ignited by an electrical spark igniter. Combustion gases are collected by an exhaust hood for further analysis. This gas analysis makes it possible to calculate heat release rate and to assess production of toxic gases from the specimen. Smoke production is assessed by measuring attenuation of a laser beam by smoke in the exhaust duct. The attenuation is related to volume flow, resulting in a measure of smoke density called smoke extinction area [m$^2$/s], the higher the smoke extinction area, the higher being the smoke density, i.e. the smoke produced by the specimen.

The specimen is mounted on a load cell which records the mass loss rate of the specimen during combustion. A thorough analysis requires testing at several irradiance levels. Typical levels of irradiance are 35, 50 and 75 kW/m$^2$. According to ASTM E 1354-02 standard, three specimens shall be tested at each heat flux level. Compositions according to the invention were tested at 35, 50 and 75 kW/m$^2$; development work was mainly carried out at an irradiance of 75 kW/m$^2$, as the composition would not generally ignite at lower irradiance levels.

Compositions were tested under the form of films or plaques, having a surface essentially flat. At least 12 specimens for each composition were tested.

The specimens had a surface area of 100 mm×100 mm (+0-5 mm) and a maximum thickness of 50 mm.

Fire Test Chamber Test

The fire test chamber (elongated furnace) and procedure set forth in NFPA-255 procedure was used to expose 25 ft (7.6 m) lengths of cable to burning along 5 ft (1.5 m) of the 25 ft length (7.6 m) of the furnace, the furnace being operated according to the instructions set out in NFPA-255. The lengths of cable for testing were placed in side-by-side contact with one another so as to fill the test space above the burner of the furnace with a bed of single thickness cable, and the cable was supported by metal rods spanning the furnace and spaced one foot (30.5 cm) apart along the length of the furnace and the length of the cables. Additional support for the cables was provided by steel poultry netting, such as chicken wire, laying on the metal rods and the cable laying on the poultry netting, as set forth in Appendix B-7.2. A large number of cables, each 25 ft (7.6 m) long, were laid on the poultry netting as described above, such that for the common 4-pair twisted cable, having a jacket thickness of about 10 mils (0.25 mm), more than 100 cables, each 25 ft (7.6 m) long, were tested at one time.

Generally, 113 cable lengths were used for testing.

The furnace was fully burnt-out and cleaned in between every run.

Flame Spread Ratings and Smoke Developed Index were thus determined following Chapter 3, Appendix A of NFPA-255.

Small Scale Evaluation of the Compositions in the Pan Test

A large list of compositions comprising HYFLON® MFA 1041 and different smoke-suppressant was test via the so-called pan test at 325° C. for 3 hours.

Three levels of concentrations were evaluated in this step, namely, 0.1, 0.5 and 1.0%.

Table 1 summarizes results of this screening.

TABLE 1

| Chemical additive | Conc. | Pass/fail | Comments |
|---|---|---|---|
| Aluminium trihydrate (ATH) | 0.1% wt | FAIL | Moderate bubbling with surface discoloration |
| ATH | 0.5% wt | FAIL | Foaming/bubbling, dark brown compound |
| ATH | 1.0% wt | FAIL | Heavy foaming/bubbling |
| Zinc stannate (ZnSnO$_3$) | 0.1% wt | FAIL | Dark-reddish brown |
| ZnSnO$_3$ | 0.5% wt | FAIL | Dark-reddish brown |
| ZnSnO$_3$ | 1.0% wt | FAIL | Black with foaming |
| Borax | 0.1% wt | FAIL | Brownish-black with moderate foaming |
| Borax | 0.5% wt | FAIL | Dark brown with foaming/bubbling |
| Borax | 1.0% wt | FAIL | Heavy foaming and dark brown |
| Magnesium hydroxide [Mg(OH)$_2$] | 0.1% wt | FAIL | Some bubbles and foam expansion |

TABLE 1-continued

| | | | |
|---|---|---|---|
| Mg(OH)$_2$ | 0.5% wt | FAIL | Heavy bubbling/foaming and discoloration |
| Mg(OH)$_2$ | 1.0% wt | FAIL | Heavy foamed expansion with black cross-section |
| Boron oxide (B$_2$O$_3$) | 0.1% wt | FAIL | Glossy surface, white foam expansion in cross section |
| B$_2$O$_3$ | 0.5% wt | FAIL | Heavy white foaming in cross section |
| B$_2$O$_3$ | 1.0% wt | FAIL | Heavy white foaming in cross section with grey discoloration |
| Bismuth succinate | 0.1% wt | FAIL | Dark brown with bubbling/foaming in cross section |
| Bismuth succinate | 0.5% wt | FAIL | Black with heavy foam |
| Bismuth succinate | 1.0% wt | FAIL | Black with heavy foam |
| Zinc hydrostannate (ZHS) | 0.1% wt | FAIL | Orange/brown surface with some moderate bubbling |
| ZHS | 0.5% wt | FAIL | Very dark grey/black with some moderate bubbling |
| KEMGARD ® 911C[1] | 0.5% wt | PASS | |
| KEMGARD ® 911C[1] | 1.0% wt | PASS | |
| KEMGARD ® 911B[2] | 0.5% wt | PASS | |
| KEMGARD ® 911B[2] | 1.0% wt | PASS | |
| Highly concentrated Calcium Molybdate (HCCM) | 0.5% wt | PASS | |
| HCCM | 1.0% wt | PASS | |
| FIREBRAKE 500[3] | 0.5% wt | PASS | |
| FIREBRAKE 500[3] | 1.0% wt | PASS | |
| KEMGARD ® CZB[4] | 0.5% wt | PASS | |
| KEMGARD ® CZB[4] | 1.0% wt | PASS | |
| KEMGARD ® CZZB[5] | 0.5% wt | PASS | |
| KEMGARD ® CZZB[5] | 1.0% wt | PASS | |

[1] KEMGARD ® 911C is a zinc molybdate/magnesium silicate complex available from Sherwin-Williams Chemicals, having a median particle size (d$_{50}$) of 3.3 μm and a 325 mesh residue of less than 0.20% wt.
[2] KEMGARD ® 911B is a basic zinc molybdate complex available from Sherwin-Williams Chemicals, having a median particle size (d$_{50}$) of 2.3 μm and a 325 mesh residue of less than 0.01% wt.
[3] FIREBRAKE ® 500 is a dehydrated zinc borate (theoretical weight composition: B$_2$O$_3$: 56.20%; ZnO: 43.80%) available from U.S. BORAX Inc., having a median particle size (d$_{50}$) of 10 μm.
[4] KEMGARD ® CZB is a calcium molybdate/zinc molybdate complex experimental product from Sherwin-Williams Chemicals.
[5] KEMGARD ® CZZB is a calcium molybdate/zinc molybdate complex experimental product from Sherwin-Williams Chemicals.

Film Extrusion from Compositions and Cone Calorimeter Results

Films [film thickness: 15-20 mils (380-580 m); film width: 5 inc. (12.7 cm)] were extrusion molded in a film extruder in the following conditions, using a standard Killion MFA screw (unfluted metering) and Monel corrosion-resistant screen packs (80/100/80 mesh):

| | |
|---|---|
| Die gap | 20-25 mils (500-635 μm) |
| Screw speed | 55 rpm |
| Zone 1 T | 600 F. (315° C.) |
| Zone 2 T | 630 F. (332° C.) |
| Zone 3 T | 640 F. (338° C.) |
| clamp T | 645 F. (340° C.) |
| adapter T | 655 F. (346° C.) |
| die T | 670 F. (354° C.) |
| melt T | 670 F. (354° C.) |
| Amperage | 6 Amps |
| Melt pressure | 1500 psi (102 Atm) |
| Roll T | 300 F. (149° C.) |

Film processing was an useful test for appreciating capability of inventive materials to be processed at high speed extrusion rate with reduced amounts of materials.

Otherwise plaques were compression molded from polymer composition.

Cone calorimeter tests were performed on compositions under the form of films and/or plaques at 75 kW/m$^2$. Results are summarized in the following table (Table 2), as well as results obtained for comparison with HYFLON® 1041 MFA and TEFLON® FEP 5100 with no additive. Three series of tests have been carried out by slightly changing mounting conditions (presence and location of an extra grid on the top). Values should be thus considered separately within the context of each round of cone calorimeter runs.

TABLE 2

| Perfluoropolymer (A) | Additive | | Sample | smoke extinction area [m$^2$/s] |
|---|---|---|---|---|
| | nature | (% wt of (A)) | | |
| First series | | | | |
| TEFLON ® FEP 5100 | none | — | plaque | 0.07 |
| TEFLON ® FEP 5100 | none | — | film | 0.06 |
| HYFLON ® MFA 1041 | none | — | plaque | 0.19 |
| HYFLON ® MFA 1041 | none | — | film | 0.15 |
| HYFLON ® MFA 640 | none | — | plaque | 0.14 |

TABLE 2-continued

| | | | | |
|---|---|---|---|---|
| HYFLON ® MFA 640 | none | — | film | 0.16 |
| HYFLON ® MFA 620 | none | — | plaque | 0.24 |
| HYFLON ® MFA 620 | none | — | film | 0.23 |
| HYFLON ® MFA 660 | none | — | plaque | 0.24 |
| HYFLON ® MFA 660 | none | — | film | 0.25 |
| Second series | | | | |
| TEFLON ® FEP 5100 | none | — | film | 0.25 |
| HYFLON ® MFA 1041 | none | — | film | 0.39 |
| HYFLON ® MFA 1041 | KEMGARD ® 911C | 0.30 | film | 0.25 |
| | | 1.00 | | 0.27 |
| HYFLON ® MFA 1041 | KEMGARD ® 911B | 0.30 | film | 0.31 |
| | | 1.00 | | 0.26 |
| HYFLON ® MFA 1041 | FIREBRAKE ® 500 | 0.30 | film | 0.27 |
| | | 1.00 | | 0.30 |
| HYFLON ® MFA 1041 | KEMGARD ® CZB | 0.30 | film | 0.25 |
| | | 1.00 | | 0.24 |
| HYFLON ® MFA 1041 | KEMGARD ® CZZB | 0.30 | film | 0.27 |
| | | 1.00 | | 0.20 |
| HYFLON ® MFA 1041 | Calcium Molybdate | 0.30 | film | 0.22 |
| | | 1.00 | | 0.28 |
| Third series | | | | |
| TEFLON ® FEP 5100 | none | — | film | 0.04 |
| HYFLON ® MFA 1041 | none | — | film | 0.25 |
| HYFLON ® MFA 1041 | KEMGARD ® 911C | 0.30 | film | 0.18 |
| | | 0.15 | | 0.23 |
| HYFLON ® MFA 1041 | Calcium Molybdate | 0.30 | film | 0.10 |
| | | 0.15 | | 0.21 |

Manufacture of Plenum Cable

Primary insulated wires were prepared using a wire-line equipped with a B&H 75 crosshead and a Entwhistle extruder (L/D=26:1; screw: 1.5 in (38 mm)), equipped with a tip having an outer diameter of 0.305 inches (7.747 mm), a die having an inner diameter of 0.440 inches (11.176 mm) and 40/60 mesh screens. The metal wire conductor was a cooper cable having an average diameter of 0.032 inches (812 μm) (preheated with a preheater T of 250 F (121° C.)). The throughput speed of the extrusion line was set as a function of the desired thickness of coating material, in order to obtain a coated wire having an average diameter of 0.0465 inc (1180 μm). At fixed distance from the extrusion head there was a cooling pipe [containing cold water at T~70 F (21° C.)] in order to cool down the extruded material. The coated cable was finally wound on a bobbin. Processing conditions for all compositions are listed here below:

| | |
|---|---|
| Zone 1 T | 550 F. (288° C.) |
| Zone 2 T | 575 F. (302° C.) |
| Zone 3 T | 650 F. (343° C.) |
| Zone 3 T | 700 F. (371° C.) |
| Flange T | 740 F. (393° C.) |
| Neck T | 750 F. (399° C.) |
| Head T | 760 F. (404° C.) |
| Die 1 T | 770 F. (410° C.) |
| Die 2 T | 770 F. (410° C.) |
| melt T | 725 F. (385° C.) |
| Amperage | 12 Amps |
| Melt pressure | 1500 psi (102 Atm) |
| Screw speed | 22 rpm |
| Line Speed | 530 ft/min (161 m/min) |

Eight reels (for 4-twisted pairs of insulated copper wire per cable) were melt extruded as above detailed, for obtaining the following color scheme, according to cable specification 5e or 6 (table 3).

TABLE 3

| Conductor identification | Color Code | Abbreviation |
|---|---|---|
| Pair 1 | White-Blue | W-BL |
| | Blue | BL |
| Pair 2 | White-Orange | W-O |
| | Orange | O |
| Pair 3 | White-Green | W-G |
| | Green | G |
| Pair 4 | White-Brown | W-BR |
| | Brown | BR |

The pairs of insulated copper wires were then cut and twisted together (pre-twisting step). Finally, the 4 twisted pairs were twisted together (gang-twisting). Finally, this core of 4-twisted pairs was extrusion-jacketed with the jacketing composition.

The general procedure for forming a jacket of the jacket composition involves extruding the composition as a jacket over a core of four twisted pairs of insulated wires to form jacketed cable, using the same wire-line as above detailed and similar extrusion conditions. The assemblage of four twisted pairs of insulated wires is fed though the cross-head and out the die tip of the crosshead. The outer diameter of the die tip is 0.305 in (7.747 mm) and the inner diameter of the die is 0.440 in (11.176 mm), with the annular space between the die tip and the I.D. of the die forming the annular space through which a molten tube of composition is extruded and drawn down to coat the assemblage of twisted pairs of insulated wire. No vacuum is used to draw the extruded tube down into a conical shape onto the core of twisted pairs of insulated wires.

Several different types of plenum cable were tested for NFPA255 and ANSI/TIA/EIA 568-B.2 electrical testing.

All cables met the electrical testing requirements of ANSI/TIA/EIA 568-B.2, Addendum 1, Category 5e. Only cables comprising a jacket made from inventive compositions (sample 2) met the electrical testing requirements of ANSI/TIA/EIA 568-B.2, Addendum 1, Category 6.

Results of furnace test according to NFPA 255 are summarized in table 4.

TABLE 4

| Sample i.d. | Flame Spread Rating | Smoke Developed Index | Time to ignition | Length of melted cable after test |
|---|---|---|---|---|
| 1C | 1.18 | 9.9 | 82 | 3 feet |
| 2 | 0 | 48.7 | 76 | 2 feet |

Sample 1C comprised primary insulation layers made from a composition comprising Daikin NEOFLON™ NP-101 FEP (having a melt flow rate according to ASTM D-2116 of 21.0~27.0 g/10 min) and a jacket made from a composition comprising Daikin NEOFLON™ NP-30 FEP (having a melt flow rate according to ASTM D-2116 of 2~3.5 g/10 min).

Sample 2 comprised primary insulation layers made from a composition comprising HYFLON® 1041 MFA, calcium molybdate (in an amount of 0.3% by weight of MFA) and KADOX® 911 Zinc oxide from Zinc Corporation of America (in an amount of 0.18% by weight of MFA) and a jacket made from composition comprising HYFLON® 640 MFA, calcium molybdate (in an amount of 0.3% by weight of MFA) and KADOX® 911 Zinc oxide (in an amount of 0.18% by weight of MFA).

The invention claimed is:

1. A composition comprising:
   at least one melt-processable per(halo)fluoropolymer (polymer A);
   from 0.01 to 4% by weight of polymer A of at least one smoke-suppressant agent (S) having a decomposition temperature of at least 350° C. selected from the group consisting of molybdenum compounds, borates of an alkaline-earth metal or of a group 12 transition metal, and mixtures thereof;
   optionally, at least one oxide of a metal different from molybdenum,
   wherein the polymer (A) is TFE copolymer comprising at least 2% wt and at most 30% wt of recurring units derived from at least one fluorinated comonomer, said fluorinated comonomer being perfluoromethylvinylether of formula $CF_2=CFOCF_3$ and/or perfluoropropylvinylether of formula $CF_2=CFOC_3F_7$.

2. A composition comprising:
   at least one melt-processable per(halo)fluoropolymer (polymer A);
   from 0.01 to 5% by weight of polymer A of at least one smoke-suppressant agent (S) having a decomposition temperature of at least 350° C. selected from the group consisting of borates of an alkaline-earth metal or of a group 12 transition metal, and mixtures thereof; and
   optionally, at least one oxide of a metal different from molybdenum,
   wherein the polymer (A) is a TFE copolymer comprising at least 2% wt and at most 30% wt recurring units derived from at least one fluorinated comonomer, said fluorinated comonomer being perfluoromethvinylether of formula $CF_2=CFOCF_3$ and/or perfluoropropylvinvlether of formula $CF_2=CFOC_3F_7$.

3. A composition consisting of:
   at least one melt-processable per(halo)fluoropolymer (polymer A); and
   from 0.01 to 5% by weight of polymer A of at least one smoke-suppressant agent (S) having a decomposition temperature of at least 350°C. selected from the group consisting of molybdenum compounds, borates of an alkaline-earth metal or of a group 12 transition metal, and mixtures thereof.

4. The composition according to claim 3, wherein the polymer (A) is a TFE copolymer consisting of at least 2% wt and at most 30% wt of recurring units derived from at least one fluorinated comonomer selected from the group consisting of:
   (i) perfluoroalkylvinylethers complying with formula $CF_2=CFOR_{f1'}$, in which $R_{f1'}$ is a $C_1$-$C_6$ perfluoroalkyl;
   (ii) perfluoro-oxyalkylvinylethers complying with formula $CF_2=CFOX_0$, in which $X_0$ is a $C_1$-$C_{12}$ perfluorooxyalkyl having one or more ether groups; and
   (iii) $C_3$-$C_8$ perfluoroolefins.

5. The composition according to claim 4, wherein the fluorinated comonomer is perfluoromethylvinylether of formula $CF_2=CFOCF_3$ and/or perfluoropropylvinylether of formula $CF_2=CFOC_3F_7$.

6. The composition according to any one of claims 1, 2, and 3 wherein the per(halo)fluoropolymer (A) is present in the composition in an amount of at least 50% by weight of the total weight of the composition.

7. The composition according to claim 1 or claim 3, wherein the smoke-suppressing agent (S) is selected from the group consisting of molybdenum compounds and mixtures thereof.

8. The composition according to claim 7, wherein the molybdenum compounds are selected from the group consisting of molybdenum trioxide, molybdenum hydroxide of the general formula $MoO(OH)_3$, molybdenum halides and oxyhalides, molybdic acid, metal or ammonium molybdates, phosphomolybdic acid and metal or ammonium phosphomolybdates.

9. The composition according to claim 7, wherein the molybdenum compounds are selected from the group consisting of molybdates of calcium, magnesium, zinc and aluminium, and mixtures thereof.

10. The composition according to any one of claims 1, 2, and 3, wherein the smoke-suppressant agent (S) is present in an amount of 0.1 to 1% by weight of per(halo)fluoropolymer (A).

11. The composition according to claim 1 or 2, said composition further comprising at least one oxide of a metal different from molybdenum in an amount from 0.075 to 1% by weight of per(halo)fluoropolymer (A).

12. A process for manufacturing the composition according to claim 1 or 2, said process comprising (i) mixing by dry blending and/or (ii) melt compounding the polymer (A), the smoke-suppressant agent (S) and optionally the oxide of a metal different from molybdenum.

13. A foamed insulation comprising the composition according to any one of claims 1, 2, and 3.

14. A cable comprising the composition according to any one of claims 1, 2, and 3.

15. The composition according to claim 4, wherein $R_{f1'}$ is selected from the group consisting of —$CF_3$, —$C_2F_5$, and —$C_3F_7$.

16. The composition according to claim 4, wherein $X_0$ is perfluoro-2-propoxy-propyl.

17. The composition according to claim 4, wherein the $C_3$-$C_8$ perfluoroolefin is hexafluoropropylene.

18. The composition according to claim 8, wherein the molybedenum halides and oxyhalides are selected from the group consisting of molybdenum pentafluoride, molybdenum hexafluoride, molybdenum pentachloride, and molybdenyl chloride ($MoO_2Cl_2$).

19. A process for manufacturing the composition according to claim 3, said process comprising (i) mixing by dry blending and/or (ii) melt compounding the polymer (A), the smoke-suppressant agent (S).

* * * * *